US012068935B2

(12) United States Patent
Mwanje et al.

(10) Patent No.: US 12,068,935 B2
(45) Date of Patent: Aug. 20, 2024

(54) COMMUNICATION SYSTEM

(71) Applicant: NOKIA SOLUTIONS AND NETWORKS OY, Espoo (FI)

(72) Inventors: Stephen Mwanje, Dorfen (DE); Darshan Ramesh, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/917,437

(22) PCT Filed: Feb. 19, 2021

(86) PCT No.: PCT/EP2021/054149
§ 371 (c)(1),
(2) Date: Oct. 6, 2022

(87) PCT Pub. No.: WO2021/204451
PCT Pub. Date: Oct. 14, 2021

(65) Prior Publication Data
US 2023/0155907 A1    May 18, 2023

(30) Foreign Application Priority Data
Apr. 7, 2020   (IN) .............................. 202041015217

(51) Int. Cl.
*H04L 43/08*         (2022.01)
*H04L 41/046*        (2022.01)
(Continued)

(52) U.S. Cl.
CPC ........ *H04L 43/0823* (2013.01); *H04L 41/046* (2013.01); *H04L 41/0631* (2013.01); *H04L 41/5041* (2013.01)

(58) Field of Classification Search
CPC ............. H04L 43/0823; H04L 41/0631; H04L 41/046; H04L 41/5041
(Continued)

(56) References Cited

U.S. PATENT DOCUMENTS 10,367,690 B2   7/2019  Sanneck et al.
10,708,122 B1 * 7/2020  Liu ......................... H04W 8/30
(Continued)

FOREIGN PATENT DOCUMENTS

| EP | 2 882 137 A1 | 6/2015 | |
|----|---|---|---|
| WO | WO-2011002464 A1 * | 1/2011 | ............ G06Q 10/00 |
| WO | WO-2020033552 A1 * | 2/2020 | ............ H04W 24/04 |

OTHER PUBLICATIONS

International Search Report and Written Opinion dated May 3, 2021 corresponding to International Application No. PCT/EP2021/054149.
(Continued)

*Primary Examiner* — Lan Dai T Truong
(74) *Attorney, Agent, or Firm* — Lippes Mathias LLP

(57) ABSTRACT

There is provided the apparatus comprising: at least one processor; and at least one memory comprising computer code that, when executed by the at least one processor, causes the apparatus to: identify a potential problem in a network comprising at least one network automation function; signal an indication of said potential problem to at least one network automation function of said network and a request for a proposal to address said problem; receive at least one proposal in response to said signalling; determine policy changes for addressing said potential problem in dependence on said at least one proposal; and implement said policy changes.

15 Claims, 8 Drawing Sheets

(51) Int. Cl.
    *H04L 41/0631*    (2022.01)
    *H04L 41/5041*    (2022.01)
    *H04L 43/0823*    (2022.01)

(58) Field of Classification Search
    USPC ........................................................ 709/224
    See application file for complete search history.

(56) References Cited

U.S. PATENT DOCUMENTS

| | | | |
|---|---|---|---|
| 2007/0300228 A1* | 12/2007 | White, III | H04L 41/0681 |
| | | | 718/102 |
| 2008/0016017 A1* | 1/2008 | Biazetti | G06N 5/02 |
| | | | 706/45 |
| 2016/0021173 A1* | 1/2016 | Tapia | H04L 67/125 |
| | | | 709/204 |
| 2018/0039654 A1* | 2/2018 | Rodrigues | H04L 67/1097 |
| 2020/0162312 A1* | 5/2020 | Balasubramanian | G06N 5/022 |

OTHER PUBLICATIONS

3GPP TR 21.905 V16.0.0 (Jun. 2019), Technical Report, 3rd Generation Partnership Project; Technical Specification Group Services and System Aspects; Vocabulary for 3GPP Specifications (Release 16), Jun. 2019.

* cited by examiner

COMMUNICATION SYSTEM

FIELD

The present application relates to a method, apparatus, and computer program.

BACKGROUND

A communication system can be seen as a facility that enables communication sessions between two or more entities such as user terminals, base stations/access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to a first aspect, there is provided an apparatus for a central controller, the apparatus comprising: means for identifying a potential problem in a network comprising at least one network automation functions; means for signalling an indication of said potential problem to at least one network automation function of said network and a request for a proposal to address said problem; means for receiving at least one proposal in response to said signalling; means for determining policy changes for addressing said potential problem in dependence on said at least one proposal; and means for implementing said policy changes.

Said means for implementing said policy changes may comprise signalling instructions to at least one of said at least one network automation functions.

The apparatus may further comprise: means for, after the means for implementing have been operated, causing at least one of said at least one network automation functions to monitor the network for a predetermined time period, and to report network metrics; means for receiving said reports; and means for determining whether or not to make further policy changes based on said reports. Said reports may provide at least one value indicating an aggregated score of several different network metrics.

Said means for identifying a potential problem may further comprise: means for determining a plurality of key performance indicators of a current status of the network; and means for determining if at least two of said plurality of key performance indicators indicates that there is a potential problem in the network.

Said apparatus may further comprise: means for receiving respective requests from at least two network automation functions for changing network parameters; and means for determining whether or not the respective requests may be complied with contemporaneously; and means for, when at least two of the respective requests may be complied with contemporaneously, implementing the at least two respective requests contemporaneously; and means for, when the respective requests may not be complied with contemporaneously, determining a precedence for complying the requests and implementing a request having the highest precedence.

According to a second aspect, there is provided an apparatus for a network automation function of a network, the apparatus comprising: means for receiving signalling from a central controller, the signalling indicating a potential problem in the network and a request for a proposal to address said potential problem; means for generating said proposal to address said potential problem; and means for signalling said proposal to the central controller.

The apparatus may further comprise: means, for after signalling said proposal, monitoring the network for a predetermined time period; and means for reporting a state of the network to the central controller based on said monitoring.

Said report may be configured to provide at least one value indicating an aggregated score of several different network metrics.

According to a third aspect, there is provided a method for an apparatus for a central controller, the method comprising: identifying a potential problem in a network comprising at least one network automation functions; signalling an indication of said potential problem to at least one network automation function of said network and a request for a proposal to address said problem; receiving at least one proposal in response to said signalling; determining policy changes for addressing said potential problem in dependence on said at least one proposal; and implementing said policy changes.

Said implementing said policy changes may comprise signalling instructions to at least one of said at least one network automation functions.

The method may further comprise: after the implementing has been operated, causing at least one of said at least one network automation functions to monitor the network for a predetermined time period, and to report network metrics; receiving said reports; and determining whether or not to make further policy changes based on said reports. Said reports may provide at least one value indicating an aggregated score of several different network metrics.

Said identifying a potential problem may further comprise: determining a plurality of key performance indicators of a current status of the network; and determining if at least two of said plurality of key performance indicators indicates that there is a potential problem in the network.

Said method may further comprise: receiving respective requests from at least two network automation functions for changing network parameters; and determining whether or not the respective requests may be complied with contemporaneously; and, when at least two of the respective requests may be complied with contemporaneously, implementing the at least two respective requests contemporaneously; and, when the respective requests may not be complied with contemporaneously, determining a precedence for complying the requests and implementing a request having the highest precedence.

According to a fourth aspect, there is provided a method for an apparatus for a network automation function of a network, the method comprising: receiving signalling from a central controller, the signalling indicating a potential problem in the network and a request for a proposal to address said potential problem; generating said proposal to address said potential problem; and signalling said proposal to the central controller.

The method may further comprise: after signalling said proposal, monitoring the network for a predetermined time period; and reporting a state of the network to the central controller based on said monitoring.

Said report may be configured to provide at least one value indicating an aggregated score of several different network metrics.

According to a fifth aspect, there is provided an apparatus for a central controller, the apparatus comprising: at least one processor, and at least one memory comprising computer code that, when operated by the at least one processor, causes the apparatus to: identify a potential problem in a network comprising at least one network automation functions; signal an indication of said potential problem to at least one network automation function of said network and a request for a proposal to address said problem; receive at least one proposal in response to said signalling; determine policy changes for addressing said potential problem in dependence on said at least one proposal; and implement said policy changes.

Said implementing said policy changes may comprise the apparatus being caused to signal instructions to at least one of said at least one network automation functions.

The apparatus may further be caused to: after the implementing has been operated, cause at least one of said at least one network automation functions to monitor the network for a predetermined time period, and to report network metrics; receive said reports; and determine whether or not to make further policy changes based on said reports. Said reports may provide at least one value indicating an aggregated score of several different network metrics.

Said identifying a potential problem may comprise the apparatus being caused to: determine a plurality of key performance indicators of a current status of the network; and determine if at least two of said plurality of key performance indicators indicates that there is a potential problem in the network.

Said apparatus may further be caused to: receive respective requests from at least two network automation functions for changing network parameters; and determine whether or not the respective requests may be complied with contemporaneously; and when at least two of the respective requests may be complied with contemporaneously, implement the at least two respective requests contemporaneously; and, when the respective requests may not be complied with contemporaneously, determine a precedence for complying the requests and implementing a request having the highest precedence.

According to a sixth aspect, there is provided an apparatus for a network automation function of a network, the apparatus comprising: at least one processor, and at least one memory comprising computer code that, when operated by the at least one processor, causes the apparatus to: receive signalling from a central controller, the signalling indicating a potential problem in the network and a request for a proposal to address said potential problem; generate said proposal to address said potential problem; and signal said proposal to the central controller.

The apparatus may further be caused to: after signalling said proposal, monitor the network for a predetermined time period; and report a state of the network to the central controller based on said monitoring.

Said report may be configured to provide at least one value indicating an aggregated score of several different network metrics.

According to a seventh aspect, there is provided an apparatus for a central controller, the apparatus comprising: identifying circuitry for identifying a potential problem in a network comprising at least one network automation functions; signalling circuitry for signalling an indication of said potential problem to at least one network automation function of said network and a request for a proposal to address said problem; receiving circuitry for receiving at least one proposal in response to said signalling; determining circuitry for determining policy changes for addressing said potential problem in dependence on said at least one proposal; and implementing circuitry for implementing said policy changes.

Said implementing circuitry for implementing said policy changes may comprise signalling circuitry for signalling instructions to at least one of said at least one network automation functions.

The apparatus may further comprise: implementing circuitry for, after the implementing circuitry for implementing has been operated, causing at least one of said at least one network automation functions to monitor the network for a predetermined time period, and to report network metrics; receiving circuitry for receiving said reports; and determining circuitry for determining whether or not to make further policy changes based on said reports. Said reports may provide at least one value indicating an aggregated score of several different network metrics.

Said identifying circuitry for identifying a potential problem may further comprise: determining circuitry for determining a plurality of key performance indicators of a current status of the network; and determining circuitry for determining if at least two of said plurality of key performance indicators indicates that there is a potential problem in the network.

Said apparatus may further comprise: receiving circuitry for receiving respective requests from at least two network automation functions for changing network parameters; and determining circuitry for determining whether or not the respective requests may be complied with contemporaneously; and implementing circuitry for, when at least two of the respective requests may be complied with contemporaneously, implementing the at least two respective requests contemporaneously; and determining circuitry for, when the respective requests may not be complied with contemporaneously, determining a precedence for complying the requests and implementing a request having the highest precedence.

According to a eighth aspect, there is provided an apparatus for a network automation function of a network, the apparatus comprising: receiving circuitry for receiving signalling from a central controller, the signalling indicating a potential problem in the network and a request for a proposal to address said potential problem; generating circuitry for generating said proposal to address said potential problem; and signalling circuitry for signalling said proposal to the central controller.

The apparatus may further comprise: monitoring circuitry, for after signalling said proposal, monitoring the network for a predetermined time period; and reporting circuitry for reporting a state of the network to the central controller based on said monitoring.

Said report may be configured to provide at least one value indicating an aggregated score of several different network metrics.

According to a ninth aspect, there is provided non-transitory computer readable medium comprising program instructions for causing an apparatus to perform at least the following: identify a potential problem in a network comprising at least one network automation functions; signal an indication of said potential problem to at least one network automation function of said network and a request for a proposal to address said problem; receive at least one proposal in response to said signalling; determine policy changes for addressing said potential problem in dependence on said at least one proposal; and implement said policy changes.

Said implementing said policy changes may comprise the apparatus being caused to signal instructions to at least one of said at least one network automation functions.

The apparatus may further be caused to: after the implementing has been operated, cause at least one of said at least one network automation functions to monitor the network for a predetermined time period, and to report network metrics; receive said reports; and determine whether or not to make further policy changes based on said reports. Said reports may provide at least one value indicating an aggregated score of several different network metrics.

Said identifying a potential problem may comprise the apparatus being caused to: determine a plurality of key performance indicators of a current status of the network; and determine if at least two of said plurality of key performance indicators indicates that there is a potential problem in the network.

Said apparatus may further be caused to: receive respective requests from at least two network automation functions for changing network parameters; and determine whether or not the respective requests may be complied with contemporaneously; and when at least two of the respective requests may be complied with contemporaneously, implement the at least two respective requests contemporaneously; and, when the respective requests may not be complied with contemporaneously, determine a precedence for complying the requests and implementing a request having the highest precedence.

According to a tenth aspect, there is provided non-transitory computer readable medium comprising program instructions for causing an apparatus to perform at least the following: receive signalling from a central controller, the signalling indicating a potential problem in the network and a request for a proposal to address said potential problem; generate said proposal to address said potential problem; and signal said proposal to the central controller.

The apparatus may further be caused to: after signalling said proposal, monitor the network for a predetermined time period; and report a state of the network to the central controller based on said monitoring.

Said report may be configured to provide at least one value indicating an aggregated score of several different network metrics.

According to an eleventh aspect, there is provided a computer program comprising program instructions for causing a computer to perform any method as described above.

According to a twelfth aspect, there is provided a computer program product stored on a medium may cause an apparatus to perform any method as described herein.

According to an thirteenth aspect, there is provided an electronic device that may comprise apparatus as described herein.

According to a fourteenth aspect, there is provided a chipset that may comprise an apparatus as described herein.

DESCRIPTION OF FIGURES

Examples will now be described, by way of example only, with reference to the accompanying Figures in which.

DETAILED DESCRIPTION

In general, the following disclosure relates to mitigating an effect of problems that arise in a network.

In particular, the following relates to a network comprise a plurality of network automation functions and a central controller for coordinating actions of the plurality of network automation functions. Actions of the network automation functions and the central controller may be considered separately.

The central controller may be arranged to, after a problem has been identified in a network, to solicit proposals for addressing the problem from network automation functions in the network. Less than all of the network automation functions in the network may be solicited for proposals. This subset of the network automation functions may be determined by the central controller in dependence on the problem being addressed.

After the selected network automation functions have determined an appropriate response, they return their respective proposals to the central controller, which evaluates the effects of each proposal on the network. The effect on a large part of the network may be considered. The effect on a part of the network not directly impacted by the proposal may be considered.

The central controller selects an proposal for implementation, and instructs at least one of the network automation functions accordingly to implement at least one policy change based on said proposal.

After the least one policy change has been implemented, network automation functions in the network may be caused to provide information to the central controller on how the change has affected their network metrics. The central controller may use this information to retain the policy change or to cause the policy change to be altered further.

Further features of this are discussed below in examples.

Before explaining in detail the examples, certain general principles of a wireless communication system and mobile communication devices are briefly explained with reference to FIGS. 1 to 2 to assist in understanding the technology underlying the described examples.

Figure 1:
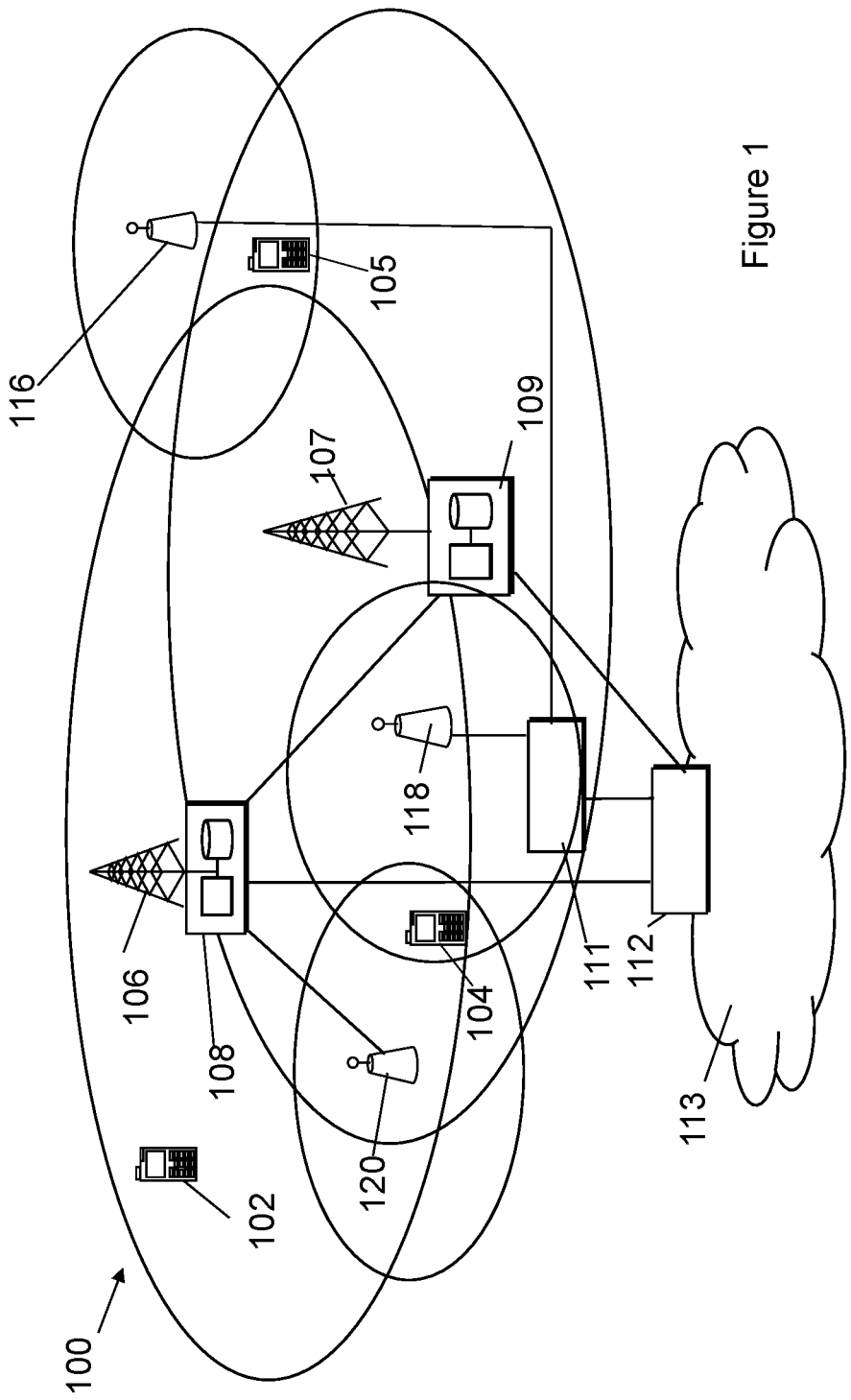
FIG. 1 shows a schematic diagram of an example communication system comprising a plurality of base stations and a plurality of communication devices.

In a wireless communication system 100, such as that shown in FIG. 1, mobile communication devices, user apparatus, or terminal 102, 104, 105 are provided wireless access via at least one base station or similar wireless transmitting and/or receiving node or point. A user can access the communication system by means of an appropriate communication device or terminal. A communication device of a user is often referred to as user equipment (UE) or as a user apparatus. Throughout the following, these terms will be used interchangeably. It is understood that the term "terminal" is used to cover communication devices that may access a network through an access node, and which may or may not have a user. Examples of such terminals without a user include devices that make machine-to-machine transmissions in a factory. A communication device is provided with an appropriate signal receiving and transmitting apparatus for enabling communications, for example enabling access to a communication network or communications directly with other users. The communication device may access a carrier provided by a station or access node, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. The LTE standard is developed by the 3rd Generation Partnership Project (3GPP). LTE was first released in 2008 (known as LTE Release 8), and new enhancements (in form of releases) has been introduced since then. LTE Release 13 and onwards is also known as LTE Advanced Pro. Another example of communications system is 5G system and New Radio (NR) radio interface, which is the latest 3GPP development.

A base station is referred to as an eNodeB (eNB) in LTE and as a gNodeB (gNB) in New Radio, and may be referred to more generally as simply a network apparatus or a network access node. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

3GPP systems may however be considered to have a so-called "flat" architecture, without the provision of RNCs; rather the (e)/(g)NB is in communication with a system architecture evolution gateway (SAE-GW) and a mobility management entity (MME), which entities may also be pooled meaning that a plurality of these nodes may serve a plurality (set) of (e)/(g)NBs. Each user apparatus is served by only one MME and/or S-GW at a time and the (e)/(g)NB keeps track of current association. SAE-GW is a "high-level" user plane core network element in LTE, which may comprise the S-GW and the P-GW (serving gateway and packet data network gateway, respectively). The functionalities of the S-GW and P-GW are separated, and they are not required to be co-located. For 5G systems, in the 5G core the above-mentioned network entities are denoted User Plane Function (UPF) and Access and Mobility Management Function (AMF). The UPF is in charge of the user plane connectivity in the core and the AMF is in charge of access-related control plane functions in the core.

In a 3GPP system, radio resource control (RRC) is defined to be a sublayer of radio interface Layer 3 that exists in the control plane only, and which provides information transfer service to the non-access stratum (an example is provided in 3GPP Technical Specification Group Services and System Aspects 21.905). RRC is a protocol layer between a user apparatus and a base station, and is in charge of, for example, paging the user apparatus when traffic comes, establishing/maintaining or release of radio links (establishing an RRC connection between user apparatus and (e)/(g)NB), user apparatus mobility, user apparatus measurement configuration and user apparatus reporting configuration, etc. RRC is also responsible for controlling the configuration of radio interface Layers 1 and 2.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst station 120 connects via the controller apparatus 108. In some examples, the smaller stations may not be provided. It is understood that this is just an example communication system, and other network structures may be defined by an operating communication protocol.

Figure 2:
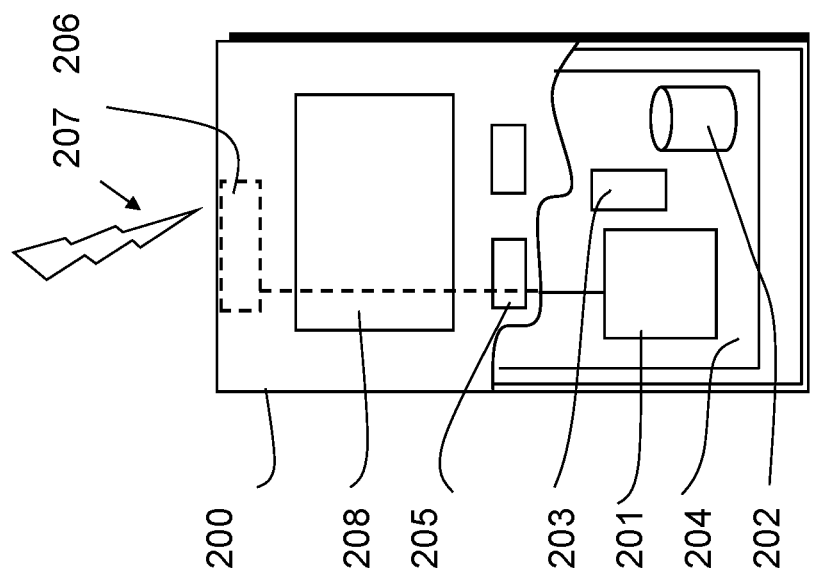
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment, apparatus or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. Other non-limiting examples include apparatuses that may be used for Industrial Internet of things applications, such as, for example, smart robotics, assembly devices, warehouse-based devices, intelligent logistics, etc. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information. It is understood that although a "mobile" communication device is referred to in the above and in the following, that the communication device may be stationary for extended periods of time.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the 5th Generation (5G) New Radio (NR). Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Figure 3:
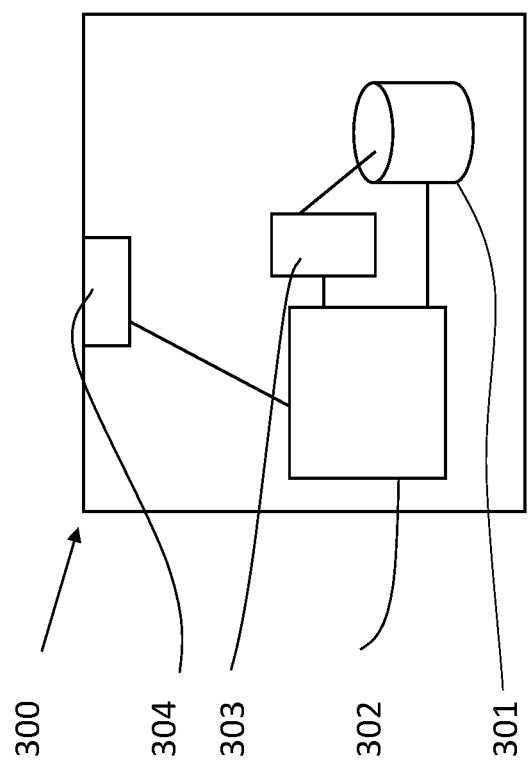
FIG. 3 shows a schematic diagram of an example network element.

An example network equipment for the 3GPP system is shown in FIG. 3. FIG. 3 shows an example of a control apparatus 300 for a communication system, for example to be coupled to and/or for controlling a station of an access system, such as a radio access network node, e.g. a base station or (g) node B, or a node of a core network such as an MME or Access and Mobility Management Function (AMF). The method may be implanted in a single control apparatus or across more than one control apparatus. The control apparatus may be integrated with or external to a node or module of a core network or radio access network. In some examples, base stations comprise a separate control apparatus unit or module. In other examples, the control apparatus can be another network element such as a radio network controller or a spectrum controller. In some examples, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example, the control apparatus 300 can be configured to execute an appropriate software code to provide the control functions. Control apparatus 300 may be included in a chipset or modem apparatus. A chipset or modem apparatus which includes apparatus 300 may be included in a control node such as a gNB.

It is understood that although the example network element is shown as a single apparatus, that the functions of the network element may be split amongst several distinct apparatuses.

To this effect, several steps have recently been made in terms of network automation. Network automation is a process of automating at least one of the configuring, managing, testing, deploying and operating of physical and/or virtual devices within a network. This provides advantages to a network as everyday network tasks and functions may be delegated to respective network automation functions. Network automation functions may be present in both self-organising networks (SON) and cognitive networks. These types of networks will be discussed in turn.

SONs aim to provide a solution in which each network problem is addressed by a single SON function, and a single SON function may address multiple problems. An SON function is a closed control loop algorithm that acquires data from the network and uses the measurements contained in this data to determine or compute new configuration values for the network (element) according to a set of algorithm internal rules or policies (in the following, these configuration values will be called "network configurations"). In other words, the function is a state machine that matches inputs (network key performance indicators (KPIs)) to outputs (network configurations). It has fixed behavior in that its input-output relationship, or the path thereto, is predesigned into the solution through the rules of the algorithm (for example, states and state transitions).

Management and coordination of multiple SON functions is performed in a hierarchical manner. For example, SON coordination and management may be performed by non-cognitive centralised functions according to rather fixed rules, or through policies that are created based on fixed rules and input from MNO and SON manufacturer.

Figure 4:
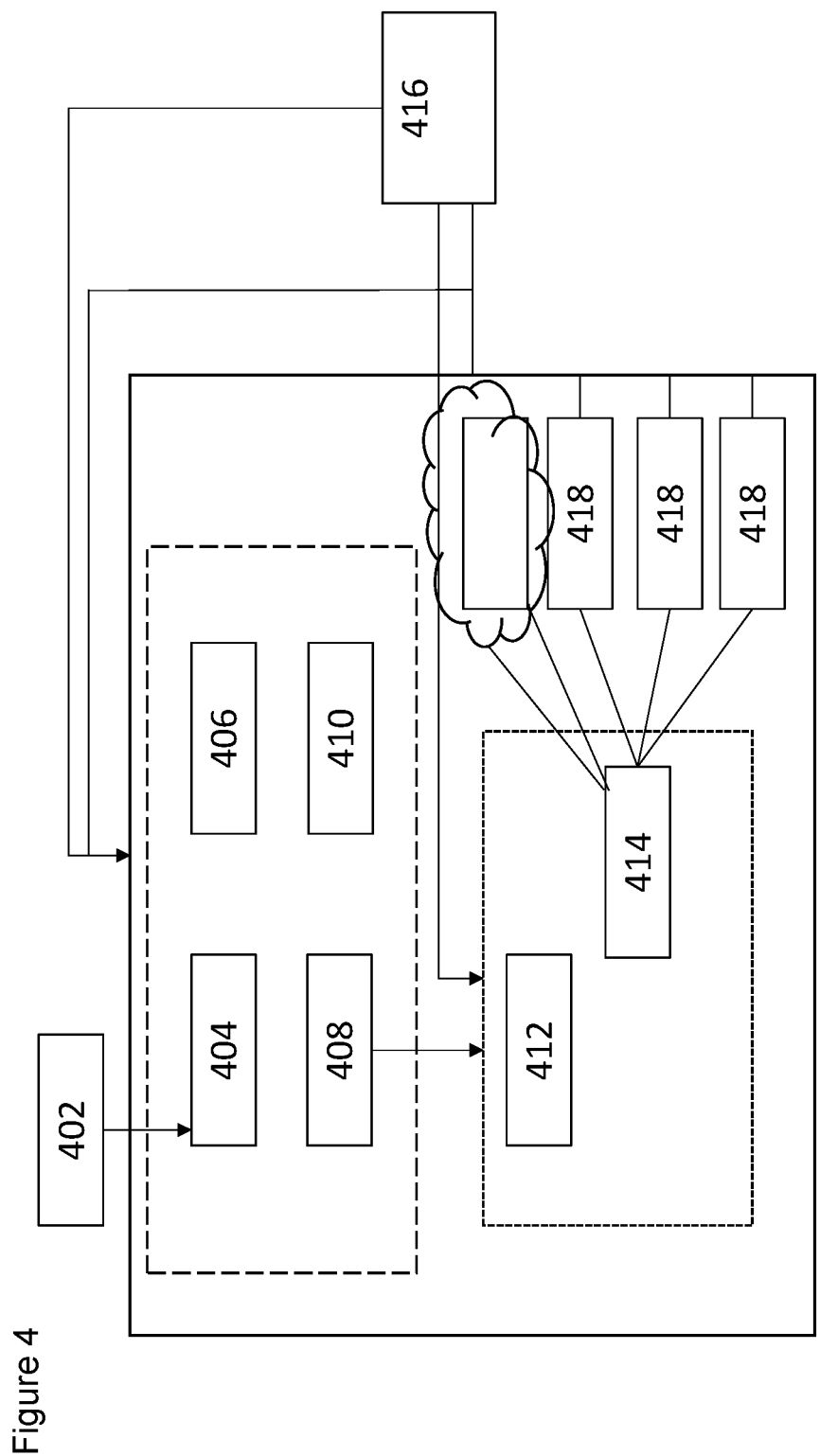
FIG. 4 shows an example network.

FIG. 4 is block diagram of a system utilising a typical SON implementation. SON may operate (as may cognitive networks) in an environment 416 characterized by invisible, non-modeled static and dynamic characteristics that influence a defined set of KPIs. Examples of static characteristics include locality, base station location, operating technology and available spectrum. Examples of dynamic characteristics include velocity of apparatus, user count, number of applications accessing services, etc. Within a SON, the SON functions have a limited view on the environment, and use an external SON management that takes this view for them. Furthermore, this SON management only knows about pre-defined types of context, but cannot detect new ones.

Consequently, by relying on KPIs, as is the case with SON, the performance may be limited to how much the KPIs accurately measure and abstract the environment. Cognitive networks take the next step beyond this approach and infers more about the environment than just reading the KPIs. That is, cognitive networks allow cognitive network functions to detect within which context and in which environment the cognitive network functions work and to identify potential new context or a new environment. The same counts for services requirements.

Each SON "solution" to a network problem may involve implementing a decision matrix 414 that matches combinations of KPIs 412 to network configurations 418 (which, as described above, may be considered as function-internal states of the state machine). In this case, the network configuration, which is the output of the SON algorithm, is a particular combination of Network Configuration Parameters (NCPs). The function may consider the current network configuration as input to the decision-making process. However, the function always has only one network configuration active at any one time, chosen from a limited set of possible network configurations.

The designer may choose to decouple some system-wide functionality, such as coordination 410 and verification 408, from the SON function itself and place it into a SON operation layer. This is because the same subset of NCPs may be subject to reconfiguration after being triggered by any of a plurality of different SON functions. For example, both Mobility Robustness Optimization, MRO and Mobility Load Balancing, MLB configure Cell-Individual Offset, CIO. Consequently, decisions of SON functions may be coordinated on a logically centralised level.

In contrast to self-organizing networks, cognitive networks learn from their operating history in and for different operating contexts in order to determine an optimal response for each context. They may therefore make better decisions than SONs in response to changing networks as they gather data on previous decisions.

With the success of SONs, but also its shortcomings in terms of flexibility and adaptability to changing and complex environments, there is a strong demand for more intelligence and autonomy in network Operations, Administration and Management (OAM) functions, and, consequently, for the use of cognitive autonomous networks within this core network level.

There are several objectives of cognitive autonomous networks for OAM functions. First, that OAM cognitive network functions are able to use higher level goals to derive corresponding performance targets. Second, that OAM cognitive network functions are able to learn from their environment and their individual or shred experiences therein. Third, that OAM cognitive network functions learn to contextualise their operation conditions to determine their optimal behavior for specific environments and contexts. Such learning may be based on various types of data available in the network. Such available data may include any of performance information, failure information, configuration data, network planning data, and user- and service-related data. The learning may also be based on the actions and the corresponding impact of the OAM cognitive network functions themselves. The learning and the knowledge built form the learned information shall thereby increase the autonomy of the OAM cognitive network functions.

Different network automation functions may also be provided by different vendors and multiple network automation functions may exist within the cognitive autonomous networks system. Each of these functions may have a single objective, and propose recommendations and/or policy changes to be executed on the network. This is also the case for other types of network systems, such as SONs. The changes proposed changes are sometimes counterproductive, even when not necessarily conflicting, as a network automation function will often only consider the impact of the overall network, including on only a single network automation function.

Some SON systems have provided some techniques for coordinating conflicting network automation functions. These coordinators are usually used as mediators whenever two network automation functions have a conflict. Such coordinators are not needed in a cognitive network as conflicts are dealt with by each network automation function continually evaluating a state of the network that they affect and optimising their operation in response to current network conditions. To this effect, network automation functions themselves may include functionality for providing some coordination between different functions performed by that network automation function. This coordination is normally also restricted to parts of a network immediately influenced by that network automation function.

Another system that has been proposed to address coordination issues in cognitive networks is to use a metric known as Action Quality Indicators (AQIs). An AQI is some measurement of how a particular action by a first network automation function has affected the network conditions/operation of other network automation functions. For example, following an action from a given network automation function, peer network automation functions grade their observed effects, with the AQIs as a "grade". The peers then report these grades/AQIs to the network automation function that's made the change, which then aggregates them to learn how good or bad the action was on the entire network.

The present application proposes a central controller to provide coordination functions between multiple network automation functions to address issues in previously proposed systems. In particular, the use of a central controller may allow for an effect of a change in a configuration to be determined on the scale of a large part of a network. Moreover, the use of a central controller means that no assumption needs to be made about the capabilities of individual network automation functions to relate and identify themselves with the problems occurring in a network.

To effect this, there is proposed a central controller that is configured to, after becoming aware of a problem in the network, to identify at least one network automation function whose actions may impact on that problem and to solicit a recommendation for addressing that problem from the at least one network automation function. In response to this solicitation, the central controller may receive respective recommendations from the at least one network automation functions, and may determine a mechanism for addressing the problem based on the proposal(s). The central controller may then instruct at least one of the at least one network automation functions to implement a change in their behaviour using this determined mechanism.

The proposed central controller may also be configured to monitor the effect that this implemented change has on a network. For example, in addition to addressing the initially identified problem, the central controller may monitor other metrics in a network to determine if any adverse effects have resulted as a result of the implemented change, and whether or not such adverse effects are greater than a respective threshold for that metric. The central controller may monitor such effects by receiving reports on such metrics from network automation functions in the network. These network automation functions may be explicitly instructed by the central controller to report the changes. These network automation functions may be configured to simply report any changes in metrics above a threshold to the central controller regardless of an explicit instruction to do so.

Based on the monitoring, the central controller may make no further action in response to the implemented change. Based on the monitoring, the central controller may cause the implemented change to be reverted. Based on the monitoring, the central controller may instruct at least one network automation function to implement a different change. This different change may be elected as a result of the initial set of proposals received from the at least one network automation functions, or as a result of a new solicitation of proposals. The at least one network automation functions may take the results of monitoring into account when providing proposals in response to the new solicitation.

The central controller may be configured to control/instruct network automation functions from multiple vendors. This may be beneficial as a network operator may not find it appropriate to grant access to the network to all the different vendors for both security and operability reasons, and so the use of a central controller that has responsibility for an end-to-end performance aspect of a network may be advantageous over systems in which network automation functions seek to provide an end-to-end performance aspect.

In the above, the central controller may have access to and use a library comprising the capabilities of each network automation function it may instruct. This library is a database in which the capabilities of each network automation function added to the automation system may be registered. The capabilities of a network automation function may include the problems it can solve as well as any Key Performance Indicators (KPIs) it is known to affect.

The central controller may be a default component of a cognitive autonomous network system in that even without other network automation functions, it must be provided so that any network automation functions that are later-on added use it for activating their recommended policy and/or network configuration changes.

The proposed central controller may thus be considered as an entity configured to take responsibility for the end-to-end performance of a cognitive autonomous network. The central controller may manage control, coordination and configuration of network automation to, among other things:

- Diagnose multi-KPI network problem(s) from network data and identify a "best" network automation function to address the identified problem(s).
- Ensure proper concurrency control. This means that each network resource is accessed without conflicting race conditions by only one network automation function at a time.
- Undertake network automation function configurations management by learning and defining the appropriately applicable control and operational parameter spaces for the individual network automation functions.
- Coordinate the learning and optimization actions of the different network automation functions. Learning and implementing function coordination decisions among which decisions may be made by adjusting the concurrency control policies or the function configurations The following will provide some specific examples of potential systems, before a more general overview of the operations of the different network entities is provided in several flow charts.

The described central controller of a network or a multi-functional analytics service in support of a central controller of a network may be configured evaluate the state of the network to diagnose whether there is a large-scale problem in the network and what it might be. In general, such a problem cannot be concluded from a single KPI. This is because when only a single KPI is affected, the network automation function responsible for that KPI may simply be triggered. Instead, it is typically a big rare event which can only be determined from multiple KPIs.

For an example rare event, consider the observation that there are too many handover failures for a given cell. In this case, the handover failure count may be larger than a threshold amount, indicating that there is a problem I the network. Handover failures may be caused: a) by physical layer cell identity configuration problems in which there are physical layer cell identity conflicts and confusions on undertaking handovers; b) by poor configuration of Mobility Robustness Optimisation parameters, which may lead to Radio Link Failures and subsequently to handover failures; and/or c) by too much interference in the cell, which causes significant signal degradation at the cell edges and subsequently to handover failures.

In such a scenario, no single network automation function (among interference coordination, Mobility Robustness Optimisation or physical layer cell identity assignment) can be called as a default to address these problems, as the exact cause of the problem is unknown. Instead, multiple other statistics (in addition Handover failure count) need to be analysed to determine the "best" function(s) to trigger.

To identify the exact problem, the central controller may employ different approaches. One type of simple testing include comparing measured KPIs to respective thresholds to determine whether or not KPIs are crossed. One type of more advanced analytics would involve modelling the densities of KPI values and determining if the observations are within or outside specific statistics (e.g. standard deviations) on the densities.

Once the problem has been identified problem, the central controller may be configured to determine the most appropriate network automation function to trigger. The "most appropriate" network automation function may be considered as being the network automation function determined once the central controller has run through its selection algorithms for selecting a network automation function for addressing the identified problem.

It could also be the case that there are multiple network automation functions responsible for a given KPI. This may happen, for example, in the case of a service provider having an open network automation platform on which multiple vendors can supply network automation functions. When there are multiple network automation functions like this, the network automation function to be triggered by default is not obvious and either the controller or an analytics function serving the controller is configured to determine the most appropriate network automation function to trigger for addressing the problem. To accomplish this, the central controller may rely on a Network Automation Capability Library (capability library) as follows.

For each network automation function that is added to the automation platform, the network automation function's capabilities may be added to the capability library at deployment. The capabilities may include information on the problems that the network automation function addresses, the states for which it should be called and/or the KPI is optimizes.

Then, after the central controller has determined at runtime what the problem is, the central controller may query the capability library to match the identified problem to one of the set of network automation functions that are registered in the library.

The controller may then trigger the identified network automation function to find an appropriate action for the problem.

The network automation function may generate a recommendation, which it proposes to the central controller for implementation. Such a recommendation may state the parameter(s) to be changed and the value(s) to which they may be changed. These parameters may be considered to be policy changes. The policy changes may be stated by the network automation functions as hash functions of parameter to parameter-values annotated with the time within which the values should be activated or else be discarded.

The central controller may take recommendations for changes from the network automation functions and make a decision whether to implement the policy changes or not.

The central controller may undertake control tasks for the recommended and approved configuration changes (for example, for concurrency control), to ensure that their action will not conflict with other ongoing or proposed actions. In case of conflicts the controller may choose to schedule the action to a different time from when it is proposed.

At a selected time, the central controller may implement the action and manage the subsequent coordination between the different network automation functions.

The central controller may be considered to be a meta-learning agent responsible for learning if any of the network automation functions registered in the capability library is behaving outside its expected region and for taking countermeasures if any of them are. So, for the implemented configuration changes, the central controller may manage the transaction among network automation functions that are intended to coordinate their actions and executions.

Therefore, following the execution of changes, the central controller may trigger other network automation functions than the network automation function actually implementing the changes to start a monitoring period to identify any negative effects on their metrics. This monitoring period may be for a predetermined time, t. The value of t may be signalled to the other network automation functions by the centralised function. This signalling may be implicit or explicit. The value of t may be predefined by a network operator.

At the end of the observation period the network automation functions evaluate the effects of the changes and report to the central controller their network (metric) status observations. The reports may be made in the form of Action Quality Indicators. The network automation functions may consume performance assurance, fault supervision and provisioning services on their respective network elements and in their domains to evaluate the effect of the implemented policy changes. Based on these observations, each network automation function providing feedback to the central controller may compute its AQI value according to a standardized/specified AQI range. The network automation functions may then forward this AQI value to the central controller.

On receipt of the AQI value(s), the central controller may evaluate the AQI value(s) to learn the effects of the configuration changes on the network. The evaluation is performed so that the central controller may determines if the effects are acceptable or not. To determine what is acceptable or not, the central controller may allocate weights to the different network automation functions, then compute a weighted Aggregate AQI from the received individual AQIs and test if that Aggregate AQI crosses a given threshold.

Where a given change is determined to be out of the expected range, such a change needs to be labelled accordingly. For example, the implemented change may be barred from ever being re-applied or from being reused in the specific context. This is reflective of the learning ability of the central controller.

The central controller informs the respective network automation functions of the evaluation outcome. This may be performed by sending the aggregate AQI to the network automation functions. The central controller may also accordingly re-configure the network automation function. This may be done, for example, by changing the network automation function's control parameter spaces and/or its performance targets.

Based on the evaluation outcome, the central controller determines the next action. For example, the central controller may be configured to either recall the previous network automation function to find a new configuration, to call a different network automation function to attempt the same or related problem, or to simply wait for a completely different problem if the previous problem has been successfully solved with relatively little negative effects on the network as a whole.

The following describes some of the interfaces involved in implementing the presently described techniques, along with their associated functions. This is performed in relation to FIG. 5.

Figure 5:
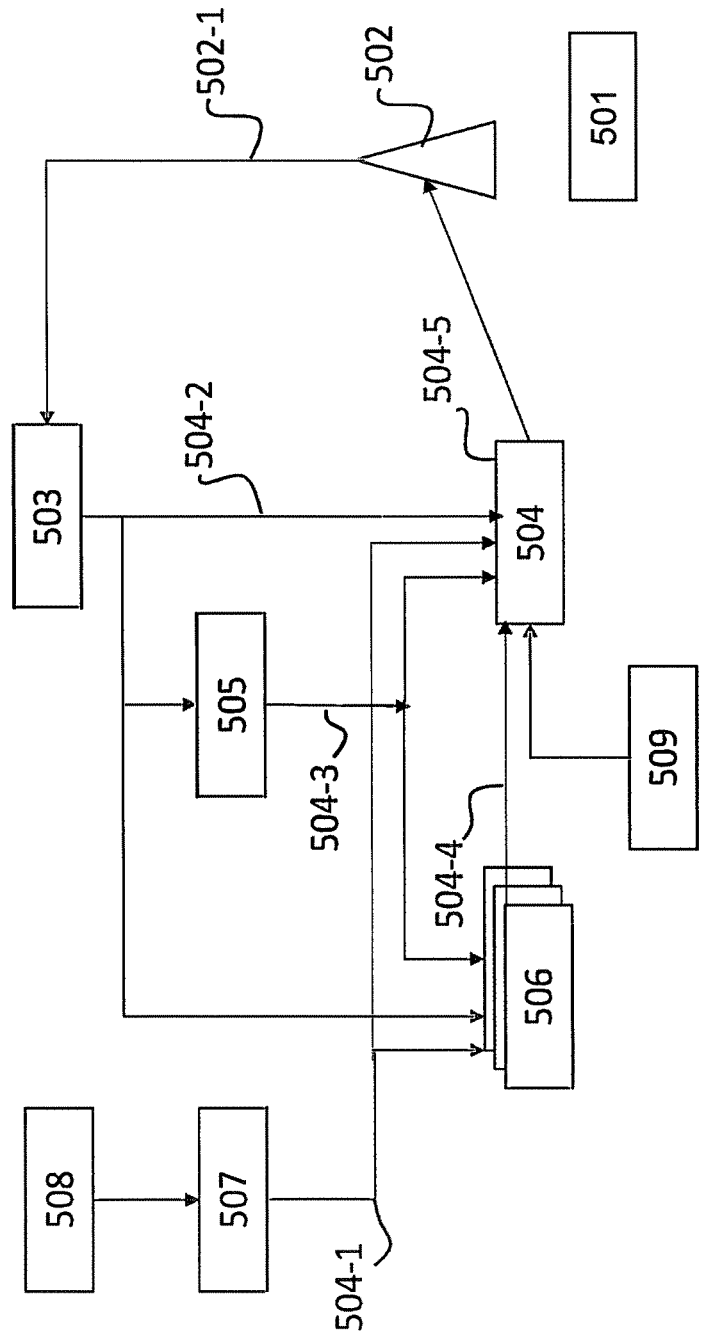
FIG. 5 shows an example network.

FIG. 5 is a schematic diagram illustrative of a network.

FIG. 5 shows a mobile terminal 501 communicating with an access point 502. The access point 502 provides information to a network data entity 503. The network data entity 503 is connected to a central controller 504 over connection 504-2, to an environment modelling and abstraction entity 505 and to network automation functions 506. The central controller 504 has several other interfaces. For example, central controller 504 has an interface 504-1 with a network objectives manager 507, an interface 504-3 with the environment modelling and abstraction entity 505, interfaces 504-4 with network automation functions 506, an interface 504-5 with the access point 502, and an interface 504-6 with a network automation capability library 509. The network application functions 506 have further interfaces with the environmental modelling and abstraction entity 505 and with the network objectives manager 507. The network objectives manager has a further interface with an operator 508 to receive operator goals.

The functions of these interfaces will now be described.

First, the interface 504-1 between the central controller and the network objectives manager 507 will be discussed.

Through this interface 504-1, the central controller receives technical objectives that are expected to be achieved within the network. These may be set either by the human operator or by an automation function responsible for deriving concrete objectives from the operators desired goals. Such an objectives-setting function is here referred to as the Network Objectives Manager. The central controller monitors the network application functions to ensure that all are contributing towards achieving the technical objectives and not towards impeding achievement of the technical objectives.

Second, the interface 504-2 between the central controller 504 and the network data entity 503 is considered. Through this interface 504-2, the central controller 504 can access raw network data (for example, measured KPIs). This raw network data may be used by network application functions 506 and the central controller 504 to learn the outcomes of earlier policy and configuration changes. This raw network data may also be used by the central controller 504 to determine that there is a problem in the network.

Third, the interface 504-3 between the central controller 504 and the environment modelling and abstraction entity 505 is considered. This interface 504-3 provides the central controller with labels about the network states. A network state is a defined combination of raw network data. This aids the central controller 504 with relating states observed in different time periods but to also reference states in a way that is understandable to other entities, which may be useful, for example, while communicating with the network automation functions 506.

The interface 504-4 between the central controller 504 and the network automation functions may have several different functions.

A first function is to help effect policy and configuration change. For this purpose, recommendations for policy changes that are computed by the network automation functions for their respective objectives are communicated via this policy change interface. As earlier stated, such a communication may be a hash function of parameter to parameter-value annotated with an indication of the time within which the change should be activated or otherwise discarded. Details of the respective communication protocol may either be standardized or proprietary for the different vendors.

A second function is to help provide feedback to network automation functions on the effect of a change made by a particular network automation function on the network. In particular, the central controller uses this feedback interface to communicate specific information to the network automation functions. For example, the central controller uses this interface to inform the network automation functions if the recommended policy change has been activated or not and possibly the reason thereof. The respective message sent to a network automation function may for example be verbalised as follows: "In network state A1, when you changed policy X from configuration X1 to X2, the observed effect on the network KPI vector v exceeded a predefined threshold. Consequently, policy configuration X2 is now barred from your applicable control and operational parameter space."

A third function is to provide configuration instructions from the central controller 504 to the network automation functions. Since the central controller is also tasked with reconfigurations of the network automation functions' applicable control and operational parameter spaces, the central controller will use interface 504-3 for such reconfigurations. For example, the central controller may mask a part of the control and operational parameter spaces such that those masked values become inaccessible for a particular network automation function. The central controller may also use the interface to activate or deactivate particular network automation functions as may be desired (e.g. based on network context).

Fifth, we consider interface 504-5 between the central controller 504 and the access point 502. In this case, the central controller 504 may activate the successful recommended policies and/or configurations on the network via this interface. In other words, the central controller may use this interface 504-5 to activate the network parameter values as suggested by the network automation functions 506. This interface is, is in effect a configuration management interface for the different network elements for which the automated network system is responsible.

The learning in the central controller 603 is based on a coordination transaction of network automation function requests and actions. Example signalling between the different network elements after the central controller has solicited proposals from at least one network application function is illustrated with respect to FIG. 6.

Figure 6:
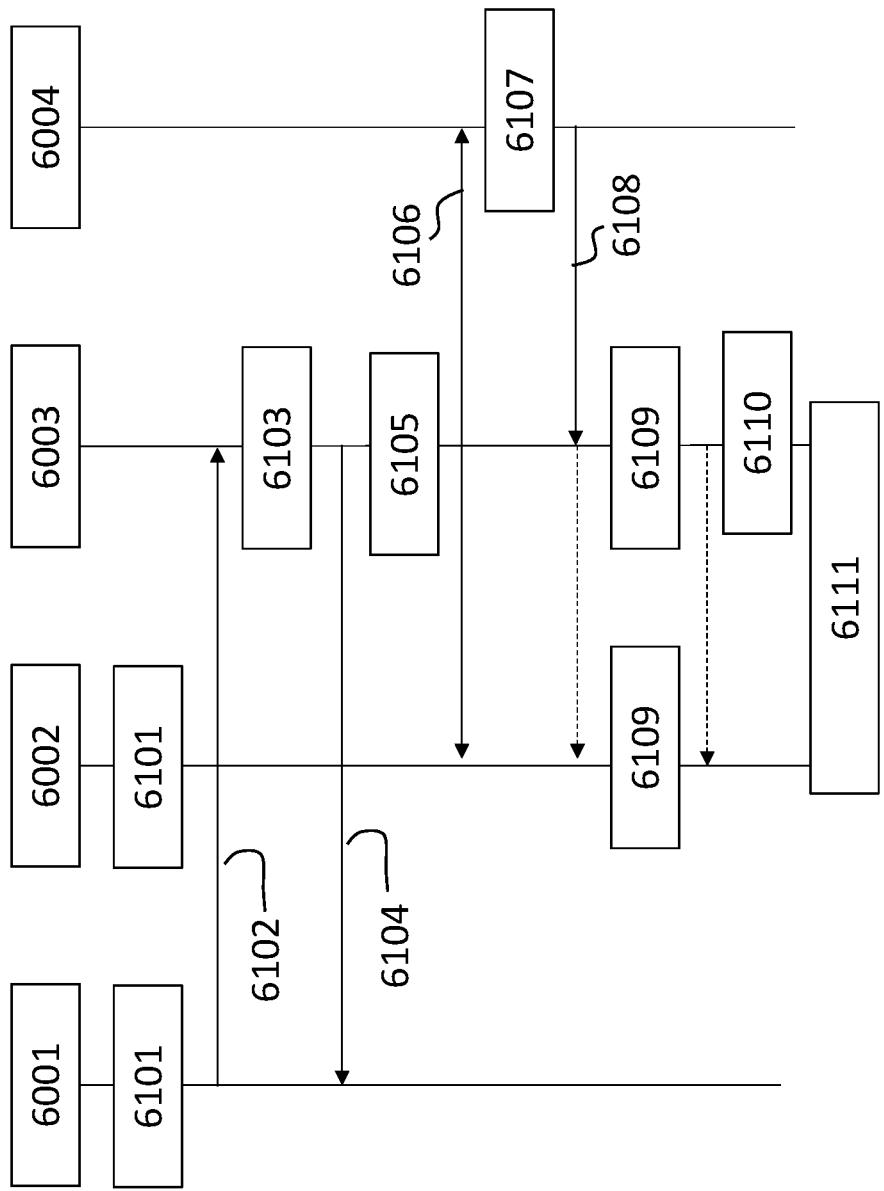
FIG. 6 shows an example signalling diagram between network entities.

FIG. 6 shows signalling between a first network automation function 6001, a second network automation function 6002, a central controller 6003 and a third network automation function 6004.

At 6101, network automation functions 6001 and 6002 compute their desired configuration change for optimising a network parameter.

At 6102, network automation functions 6001 and 6002 respectively send their proposed policy or configuration change to the central controller for execution. The form of this proposed policy or configuration change may be standardised so that multi-vendor deployment for different network automation functions may be supported.

At 6103, when multiple requests have been received by the central controller 6003 for execution within the same time window, the central controller 6003 decides if they can all be concurrently activated. For this, the central controller may determine the impact areas and times of the concurrent requests to determine if they can be executed concurrently. For example, functions or instances thereof which have non-overlapping impact areas and times, such functions can be executed concurrently. The central controller may also be able to undertake a probabilistic assignment of effects, in which case it can allow the requests to be executed concurrently and there after probabilistically allocated the observed effects to the two requests. If the requests received at 6102 cannot be concurrently activated, the central controller 6003 may decide which request takes precedence, and to activate the request taking precedence (i.e. having the highest priority for activation).

The central controller may keep a record of the prioritizations and precedence's of the network automation functions. These, which may be configured by a network operator or learned from the coordination transaction, may also allow for concurrencies among network automation functions. In other words, there may be a record of network automation functions that are allowed to concurrently execute actions and the conditions under which such concurrent operation is allowed.

At 6104, the central controller informs all the requesting/active network automation functions 6001 and 6002 about its execution decision from 6103. To support this in a multi-vendor deployment, this decision communication may have a standardized form.

At 6105, the central controller executes the selected action. This may be performed by the central controller 6003 instructing the configuration of another network element, such as a access point. The activated change may be executed using existing commands and mechanisms for configuring network resources. For example, this change may be executed/instructed using the bulk configuration procedure.

At 6106, the central controller triggers other (non-requesting) network automation functions 604 to monitor their metrics for a specified measurement period to determine an effect that the selected action has on the network. To support this in a multi-vendor deployment, this request to collect measurement for a specified time may have a standardized form.

At 6107, the peer network automation functions may collect measurements, interpret KPIs and correspondingly compute their respective AQIs. The AQI may be computed in a proprietary manner by each network automation function 6004. The form in which the AQIs are reported may be standardised across the different vendors/network automation functions 6004.

At 6108, at the end of the measurement period the network automation functions 6004 report their observed effects in the form of the Action Quality Indicator (AQI). In a multi-vendor deployment, the AQI reporting may be standardized. The AQI may be reported to only the central controller 6003 or to both the central controller 6003 and the active network automation functions 6001 and 6002.

At 6109, the central controller 6003 (and/or an active network automation function 6001, 6002 when the proposals from the network automation functions 6001 and 6002 cannot be executed concurrently) aggregates the AQIs from the multiple reporting network automation functions to produce an aggregated AQI. Then, the aggregated AQI is used to learn negative effects of executed changes. If the central controller does allow for concurrent actions, the observed effects are accorded to the single network automation function whose action was executed. If the central controller does allow for concurrent actions, the central controller 6003 applies a probabilistic effect allotment mechanism to allocate the effects to the network automation functions whose actions were concurrently executed. Where the AQIs are also reported to network automation functions 6001 and 6002, the network automation functions may do their own proprietary interpretation of the AQI independent of the interpretation performed by the central controller.

Coordination between concurrently executed functions is used to ensure that the actions of one network automation function do not cause negative effects to other network automation functions or other metrics that are not being optimized by the said network automation function. For example, both mobility robustness optimisation (MRO) functions and mobility load balance (MLB) functions influence the user's handover triggers, albeit through different control parameters. It is therefore important that the MRO, which focusses on optimizing mobility robustness, does not negatively affect MLB's metrics when they are both run simultaneously/concurrently, particularly so that the MRO does not negatively affect the distribution of load among cells more than an acceptable amount. This coordination is complicated if both functions are learning functions since they will have non-deterministic behaviour.

To address this issue, the central controller may implement coordination by evaluating effects that each network automation function has on other network automation functions and computes the corresponding parameter range within which the network automation function may be allowed to act to ensure that the would-be negatively affected network automation functions are protected. After an action is executed and the peers have reported their AQIs, the central controller may compute an aggregate AQI using the reports from all concerned peer network automation functions. The aggregation may be based on a weighting among the network automation functions. Such a weighting, which can be configured by the operator, may either be a generic weighting that is constant regardless of acting network automation function or it may be a network automation function-specific weighting.

AQI handling may also be implemented by the acting network automation function to allow for differentiated learning in the network automation functions and the central controller. The acting network automation function, however, will use network automation function-specific weightings to compare its metrics of interest against the aggregation of AQIs received from peer network automation functions. In other words, the acting network automation function focuses a lot more of its evaluation on its individual metrics of interest than the central controller does, and not on the system-wide performance that is of concern to the central controller. As a result of this comparison analysis and associated learnings, the network automation function may modify its network configuration policy.

Where the network automation functions do not implement such a coordination (which may be the case when legacy self-organising network automation functions are included in the system), the central controller takes responsibility for defining the control and operational parameter spaces of the network automation function and to ensuring minimal conflicts in all contexts.

At 6110, based on its aggregation of the AQIs and the corresponding interpretation of the aggregate AQI, the central controller 6003 computes a control decision for the active network automation function and the implemented action. Such a decision may for example be to bar the action and accordingly change the control and operational parameter spaces of the network automation function. Other such decisions may be to reconfigure one of the other network automation functions, to update the central controller's own control and coordination policies. Another decision may be to simply do nothing and instead continue to monitor the network automation functions.

At 6111, the central controller 6003 executes its decision on the active network automation function 6001, 6002. The execution may be in the form of reconfiguring some parameters of active network automation function(s). The reconfiguration may include, among other things, reconfiguring the range of the network automation function's control parameters or its context space.

Potential implementation of the decisions during 6111 are now discussed.

The simplest implementation decision made by a central controller is the confirmation of a recommended policy and/or network configuration change. This is a confirmation that a particular network automation function's change recommendation does not have unacceptable adverse effects on the network and also satisfies the existing policies. Such confirmation decisions have the highest priority among those requesting configuration changes. In such a case, the network automation function that receives the confirmation is allowed to change all the parameters listed in the change request provided that the proposed values are within the acceptable value range for the network automation function in the prevailing context. If these conditions are fulfilled, the central controller executes the changes using standard-defined mechanisms for effecting network configuration change. For example, the network configuration change may be effected using the 3GPP bulk Configuration Management change procedures. Notification that the action has been executed is then sent after the respective notification is received from the network element The central controller may have access to a table that identifies, for each operational network automation function, the current control and operational parameter spaces that that network automation function. Such a table may also comprise the context-specific subspaces, such as for example, <context, allowed parameter, allowed value range>. Thus, network automation function (re)configuration may be implemented as a notification from the central controller to the network automation function of new control and operational parameter-space limits for that network automation function, and a corresponding update of the central controller's local database of the network automation function's current control and operational parameter spaces. The notification may thus essentially informs the network automation function to limit its actions to within the specified control and operational parameter spaces, otherwise its change recommendations be denied.

The central controller may learn coordination policies between the different network automation functions. Among the aspects to be learned are:

The network automation functions that can be allowed to execute actions concurrently or otherwise. This can be learned from the observed effects of the network automation functions. For example, consider that n network automation functions send requests which the central controller sequentially activates and tracks the affected metrics. The central controller can conclude that two network automation functions can be concurrently executed if there is low correlation between the control-parameter to KPI spaces of the two network automation functions.

The order of precedence in action execution for the non-concurrent network automation functions, e.g. the case that MRO should be executed before MLB since MRO changes, which have a much longer-term impact, can obsolete MLB changes, which are a short-term measure. Appropriate learning mechanisms need to be developed for this. Simple ones using rules can in many cases suffice. An example rule can for instance be the one for MRO-MLB precedence: a network automation function 6001 should be of higher precedence than network automation function 6002 (network automation function 6001 is executed before network automation function 6002 if network automation function 6001 and network automation function 6002 has shared or correlated control parameters, yet network automation function 6001 has a longer measurement period (a longer-term impact) compared to network automation function 6002.

The parameters which each network automation function should be allowed to adjust. These will probably be among the simplest to learn since each will in general already be adjusting only a small set of parameters. The set can however be further reduced if a contention is noted among multiple network automation functions. The central controller may for example chose to assign the parameter under contention to the one with the least number of control parameters or the one with the greatest effect on the related KPIs. The central controller may also allow both network automation functions to adjust the contentious parameter but with two control loops—an external coarse control loop with a larger step change for one network automation function and an internal finer control loop for the other network automation function. The central controller can also learn by evaluating the best/worst performing cell in the same operating context to determine the parameters of a given network automation function. The central controller can also apply update the network automation functions based on the learning within the same context.

The limits within which a given network automation function can adjust the control and operational parameters, i.e. what should be the applicable control and operational parameter spaces for each network automation function? This is learned by evaluating the observed effects of different parameter value changes—both on the acting network automation function and on the other network automation functions—and barring those parameter value changes for which undesirable effects are observed.

All of these describe learning mechanisms of the central controller may be made context-specific. In other words, the central controller may learn, for each network automation function, the parameters, value ranges and allowed concurrent actors that are applicable for each combination of network and environment contexts.

Figure 7:
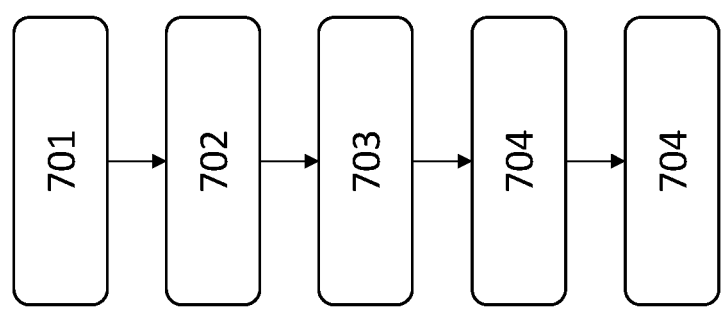
FIGS. 7 and 8 show flow charts illustrating operations of potential apparatuses.
Figure 8:
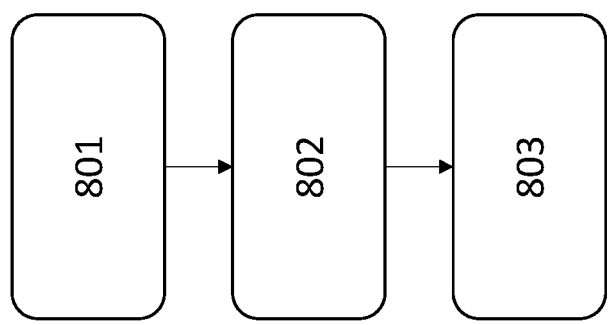

FIGS. 7 and 8 are flow charts showing potential operations of various network apparatus in the network, based on the illustrative examples above.

FIG. 7 is a flow chart illustrating operations of a potential apparatus comprised within a central controller.

At 701, the apparatus is caused to identify a potential problem in a network comprising at least one network automation functions. Identifying a potential problem may comprise determining a plurality of key performance indicators of a current status of the network, and determining if at least two of said plurality of key performance indicators indicates that there is a potential problem in the network. The apparatus may build up historical data to link combinations of key performance indicators to processes being performed in the network.

At 702, the apparatus is caused to signal an indication of said potential problem to at least one network automation function of said network and a request for a proposal to address said problem;

At 703, the apparatus is caused to receive at least one proposal in response to said signalling;

At 704, the apparatus is caused to determine policy changes for addressing said potential problem in dependence on said at least one proposal.

At 705, the apparatus is caused to implement said policy changes. The implementing said policy changes may comprise signalling instructions to at least one of said at least one network automation functions. The signalled at least one network automation functions may then implement the policy changes that relate to them.

The apparatus may further be caused to, after the policy changes have been implemented, cause at least one of said at least one network automation functions to monitor the network for a predetermined time period, and to report network metrics. The apparatus may be configured to receive said reports from at least one of the network automation functions. The apparatus may further be caused to determine whether or not to make further policy changes based on said reports.

When the apparatus determines to make further policy changes based on said reports, the apparatus may revert the policy changes instructed at 705 to the policy changes implemented when the potential problem was identified at 701. Alternatively, when the apparatus determines to make further policy changes based on said reports, the apparatus may change the policy changes instructed at 705 to policy changes considered during 704.

Said reports may provide at least one value indicating an aggregated score of several different network metrics. For example, the value may be an AQI, as discussed above.

Said apparatus may further be caused to receive respective requests from at least two network automation functions for changing network parameters. The apparatus may determine whether or not the respective requests may be complied with contemporaneously. When at least two of the respective requests may be complied with contemporaneously, the apparatus may cause implementing the at least two respective requests contemporaneously. When the respective requests may not be complied with contemporaneously, the apparatus may determine a precedence for complying the requests, and implement a request having the highest precedence from this determined precedence.

FIG. 8 illustrates potential operations of an apparatus for network automation function of a network. The apparatus of FIG. 8 may be configured to interact with the apparatus of FIG. 7.

At 801, the apparatus is caused to receive signalling from a central controller, the signalling indicating a potential problem in the network and a request for a proposal to address said potential problem.

At 802, the apparatus is caused to generate said proposal to address said potential problem.

At 803, the apparatus is caused to signal said proposal to the central controller.

The apparatus may further be caused to, after signalling said proposal, monitor the network for a predetermined time period; and report a state of the network to the central controller based on said monitoring. This monitoring may be performed following an instruction from the central controller. This monitoring may be performed automatically without instruction from an external entity.

Said report may be configured to provide at least one value indicating an aggregated score of several different network metrics.

It should be understood that each block of the flowchart of the Figures and any combination thereof may be implemented by various means or their combinations, such as hardware, software, firmware, one or more processors and/or circuitry.

It is noted that whilst examples have been described in relation to one example of a standalone 5G, similar principles may be applied in relation to other examples of standalone 3G, LTE or 5G networks. It should be noted that other examples may be based on other cellular technology other than LTE, NR or on variants of both. Therefore, although certain examples were described above by way of example with reference to certain example architectures for wireless networks, technologies and standards, examples may be applied to any other suitable forms of communication systems than those illustrated and described herein.

It is also noted herein that while the above describes examples, there are several variations and modifications which may be made to the disclosed solution without departing from the scope of the present claims.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various examples may be implemented in hardware or special purpose circuits, software, logic or any combination thereof. Some aspects of the described may be implemented in hardware, while other aspects may be implemented in firmware or software which may be executed by a controller, microprocessor or other computing device, although the claimed is not limited thereto. While various aspects of the claimed may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out examples. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the above disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary example of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of the appended claims.

The invention claimed is:

1. A central controller for controlling a plurality of network automation functions of a network, the central controller comprising:
    at least one processor; and
    at least one memory storing computer code that, when executed by the at least one processor, causes the central controller to:
        identify a potential problem in the network based on network data obtained from the network;
        select a network automation function of the plurality of network automation functions to address said potential problem;
        signal, to the selected network automation function, an indication of said potential problem and a request for a proposal to address said potential problem;
        receive, from the selected network automation function, the proposal to address said potential problem in response to said signalling;
        determine whether to implement policy changes for addressing said potential problem based on said proposal to address said potential problem; and
        implement said policy changes.

2. The central controller as claimed in claim 1, wherein said implementing said policy changes comprises signalling instructions to said selected network automation function.

3. The central controller as claimed in claim 1, wherein the central controller is further caused to:
    after said policy changes are implemented, request at least one other network automation function of the network to monitor for a predetermined time period, and request reports one network metrics;
    receive said reports;
    determine further policy changes for addressing said potential problem based on said reports And
    implement said further policy changes.

4. The central controller as claimed in claim 3, wherein said reports provide at least one value indicating an aggregated score of several different network metrics.

5. The central controller as claimed in claim 1, wherein said identifying said potential problem in the network further comprises:
 determining a plurality of key performance indicators of a current status of the network; and
 determining if at least two of said plurality of key performance indicators indicates that there is a potential problem in the network.

6. The central controller as claimed in claim 1, wherein the central controller is further caused to:
 receive respective requests from at least two of the plurality of network automation functions for changing network policies or configurations;
 determine whether or not the respective requests may be complied with contemporaneously;
 when at least two of the respective requests may be complied with contemporaneously, implement the at least two respective requests contemporaneously; and
 when the respective requests may not be complied with contemporaneously, determine a precedence for complying with the requests and implementing a request having the highest precedence.

7. The central controller of claim 1, wherein the network is a self-organizing network.

8. The central controller of claim 1, wherein the selected network automation function is selected based on capabilities of the plurality of network automation functions.

9. A method for controlling a plurality of network automation functions of a network, comprising:
 identifying a potential problem in the network based on network data obtained from the network;
 selecting a network automation function of the plurality of network automation functions to address said potential problem;
 signalling, to the selected network automation function, an indication of said potential problem and a request for a proposal to address said potential problem;
 receiving, from the selected network automation function, the proposal to address said potential problem in response to said request;
 determining whether to implement policy changes for addressing said potential problem based on said proposal to address said potential problem; and
 implementing said policy changes.

10. The method as claimed in claim 9, wherein said implementing said policy changes comprises signalling instructions to selected network automation function.

11. The method as claimed in claim 9, further comprising:
 after said policy changes are implemented, requesting at least one other network automation function of the network to monitor for a predetermined time period, and to request reports on network metrics;
 receiving said reports;
 determining further policy changes for addressing said potential problem based on said reports And
 implementing said further policy changes.

12. The method as claimed in claim 11, wherein said reports provide at least one value indicating an aggregated score of several different network metrics.

13. The method as claimed in claim 9, wherein said identifying said potential problem in the network further comprises:
 determining a plurality of key performance indicators of a current status of the network; and
 determining if at least two of said plurality of key performance indicators indicates that there is a potential problem in the network.

14. The method as claimed in claim 9, further comprising:
 receiving respective requests from at least two of the plurality of network automation functions for changing network policies or configurations;
 determining whether or not the respective requests may be complied with contemporaneously; and
 when at least two of the respective requests may be complied with contemporaneously, implementing the at least two respective requests contemporaneously; and
 when the respective requests may not be complied with contemporaneously, determining a precedence for complying with the requests and implementing a request having the highest precedence.

15. A non-transitory computer-readable medium having computer code encoded thereon that, when executed by at least one processor, causes a method for controlling a plurality of network automation functions of a network, to be performed, the method comprising:
 identifying a potential problem in the network based on network data obtained from the network;
 selecting a network automation function of the plurality of network automation functions to address said potential problem;
 signalling, to the selected network automation function, an indication of said potential problem and a request for a proposal to address said potential problem;
 receiving, from the selected network automation function, the proposal to address said potential problem in response to said request;
 determining whether to implement policy changes for addressing said potential problem based on said proposal to address said potential problem; and
 implementing said policy changes.

* * * * *